United States Patent [19]
Miyakawa et al.

[11] 3,973,835
[45] Aug. 10, 1976

[54] SECURITY VIEWING DEVICE

[76] Inventors: Jimmie Miyakawa, 7 Asbury Lane, Matawan, N.J. 07747; Donald E. Degnan, 400 Madison Ave., New York, N.Y. 10017

[22] Filed: May 5, 1975

[21] Appl. No.: 574,692

[52] U.S. Cl. ............................. 350/319; 350/174
[51] Int. Cl.² ........................................ G02B 25/04
[58] Field of Search ............... 350/21, 24, 33, 49, 350/57, 173, 174, 212, 319, 68

[56] References Cited
UNITED STATES PATENTS

| | | | |
|---|---|---|---|
| 2,262,203 | 11/1941 | Redstone et al. | 350/319 |
| 3,514,188 | 5/1970 | Blosse et al. | 350/319 X |
| 3,910,676 | 10/1975 | Fojtik et al. | 350/319 X |

*Primary Examiner*—John K. Corbin
*Assistant Examiner*—Matthew W. Koren
*Attorney, Agent, or Firm*—Kenyon & Kenyon Reilly Carr & Chapin

[57] ABSTRACT

A security viewing device which provides a viewer on one side of a door with a view of a caller whether he is standing directly outside the door or concealing himself to one side. The device includes a housing in which is mounted a stationary rotating periscope having an eye piece for the user at one end. The opposite end of the periscope is provided with two viewing ports facing in axial and radial directions. An inclined one way reflecting surface is mounted in the periscope adjacent the radial viewing port. The periscope with the two viewing ports end is enclosed in a clear plastic bubble with a portion of its top (northern) inner side darkened in opaque black. When the radial port is positioned upward or facing north, the user looks straight ahead through the one way reflecting surface and the axial viewing port at the caller. If the caller has stepped to one side, the periscope is rotated clockwise or counter clockwise until the radial viewing port clears the darkened area of the bubble so that the caller may be seen through the radial viewing port via his reflection in the inclined mirror.

7 Claims, 3 Drawing Figures

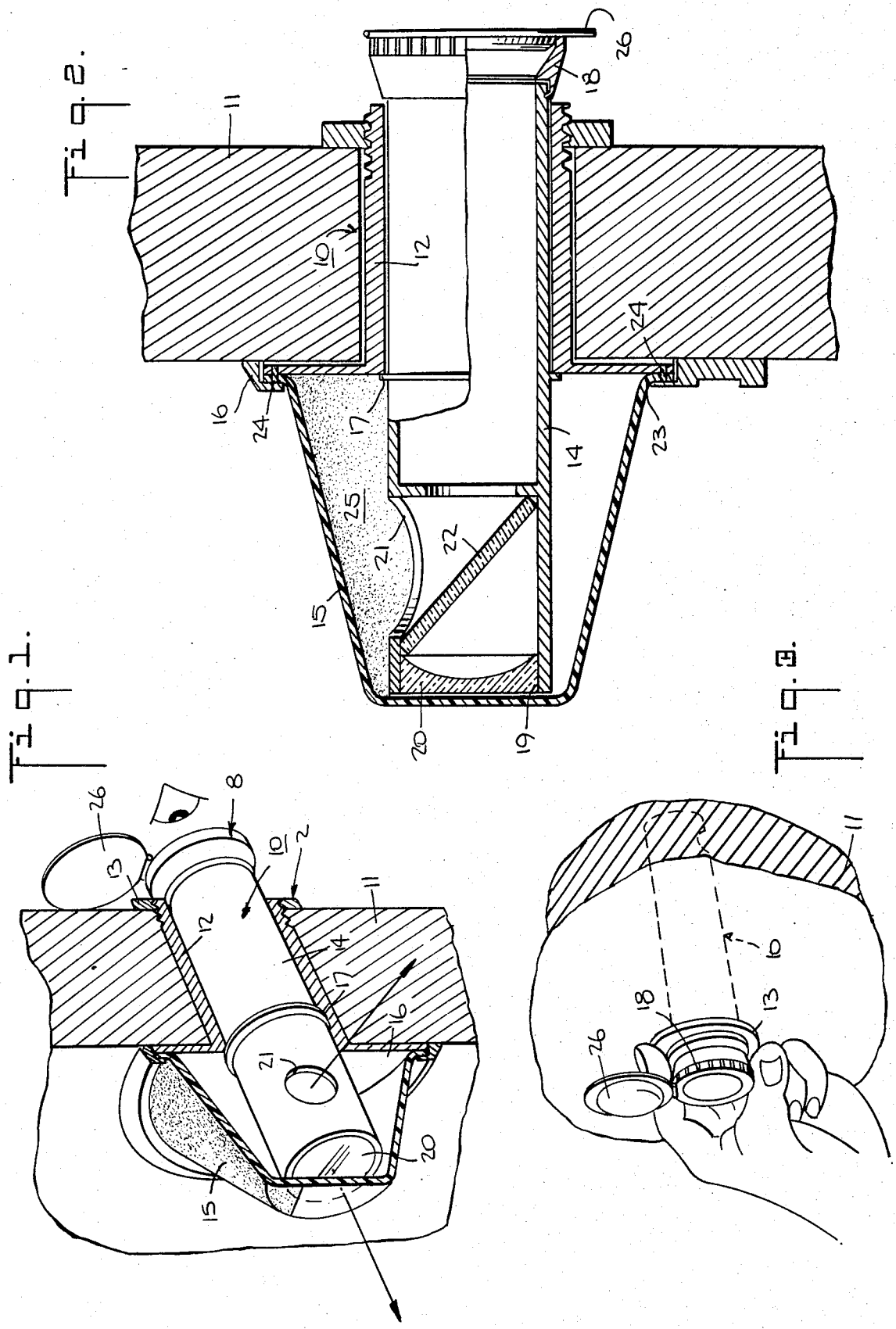

SECURITY VIEWING DEVICE

BACKGROUND OF THE INVENTION

This invention relates to a security viewing device for installation in a door, of the type used by the resident of a dwelling to establish the identity of a caller before opening the door.

Securing viewing devices to enable the resident of a dwelling to survey the identity of a caller before opening the door trace their origin back to the peephole. Although such devices have been refined, for example, by the inclusion of wide angle vision lenses to increase the field of view and by one way glass to conceal from the caller the fact that he is being observed, such devices still generally provide a restricted field of view. This restricted field of view can, on occasion, be exploited by unwelcome callers. For example, it is not unknown for criminals to work in pairs so that a resident summoned to his door may see through his viewing device only an apparently harmless caller, such as a child, whereas a criminal accomplice may be standing to the side of the door out of the field of vision waiting to gain entrance.

To avoid such disadvantages arising from the ability of a caller to position himself outside of the field of view of most existing viewing devices, it would be desirable to expand the resident's field of view so that it extended not just outwardly of the door but also sidewardly across its surfaces. Other qualities that should be sought for in a security viewing device are silence of operation and simple construction.

SUMMARY OF THE INVENTION

A security viewing device constructed in accordance with the present invention, is intended to obviate or minimize problems of the type previously described. In particular, the present security viewing device enables a resident to view a caller standing either in front of the door or attempting to conceal himself to one side.

In more detail the device includes a housing adapted to be installed in a door. A periscope is mounted in the housing with a rotational motion either in clockwise or counter clockwise direction for 360°. The periscope includes an axially facing eye piece at one end of the periscope to be used by the viewer while the opposite end of the periscope is provided with two viewing ports facing in directions axially and radially of the periscope. In addition, a transparent cover is mounted over the exposed end of the periscope. A one-way reflecting surface fixedly mounted in the periscope is positioned at an inclination to the radially facing viewing port and a portion of the inner surface of the cover is darkened to preclude a line of sight through an upper portion of the cover. When the radially facing viewing port of the passage is positioned within the darkened portion of the cover the viewer gazing through the eye piece looks directly through the one way reflecting surface and the axial viewing port at a caller standing outside the door. The periscope is then rotated clockwise or counter clockwise in which the radially facing viewing port clears the darkened portion of the cover so that a caller standing to the side of the door will be seen through the radial viewing port via the inclined reflecting surface.

The periscope is of cylindrical cross-section to facilitate rotation about its longitudinal axis to move the radial viewing port from a position in which it is scanning, for example, across the right side of the door through 180° to a position in which it is scanning across the left side of the door. In this manner a caller concealing himself to either side of the viewing device will be revealed.

BRIEF DESCRIPTION OF THE DRAWINGS

A security viewing device construction in accordance with one preferred embodiment of the invention, is illustrated in the accompanying drawings in which:

FIG. 1 is a perspective view, partially in cross-section, of a security viewing device constructed in accordance with the preferred embodiment of the invention;

FIG. 2 is a cross-sectional side view of the security viewing device shown in FIG. 1 with a cover having a darkened area (opaque blackened); and FIG. 3 is a perspective view showing how the periscope may be rotated to enable scanning in opposite sideways directions across the surface of a door.

DETAILED DESCRIPTION

Referring to FIG. 1, a security viewing device constructed in accordance with the preferred embodiment of the invention, is there shown.

The device includes a housing 10 adapted for mounting in a door 11. The housing 10 includes a collar 12 which passes through the door 11 from the outside and a retaining nut 13 threaded onto a threaded inner end of the collar 10 to secure the collar 12 in place. In addition, the device includes a cylindrical periscope 14 which is rotatably mounted within the housing 10, a transparent cover 15 mounted over the periscope 14 and a bezel 16 securing the cover 15 to the housing 10.

The periscope 14 is provided with an extended shoulder or collar 17 to abut the exterior end of the housing 10 and thereby prevent passage of the periscope 14 through the housing 10 from the outside. The periscope 14 is also provided with an eye piece 18 on the inside end. This eye piece 18 is fitted onto the periscope 14 by means of a friction fit or press-fit. In addition, the forward end of the periscope 14 is provided with an axially facing viewing port 19 constituted by the open forward end of the periscope 14 in which is mounted a plano-concave lens 20 provided with a wide angle field of vision in a direction outwardly of the door 11. An opening in the side of the periscope 14 adjacent the forward end constitutes a radially facing viewing port 21.

Fixedly mounted within the periscope 14 is a one-way reflecting surface such as a sheet of glass 22 lightly silvered on one side. The reflecting surface 22 functions either as a reflector or a transmitter of light depending upon the relative light intensities to the side and in front as will be described hereinafter. The reflecting surface 22 is fixed within the periscope 14 and positioned in underlying relation to the radial viewing port 21 so that light entering through the port 21 in a radial direction impinges upon the reflecting surface 22. The reflecting surface 22 is inclined at an angle of approximately 42° to the axis of the periscope 14 so that the light rays passing radially through the viewing port 22 are reflected through approximately 90° to travel axially towards the eye piece 18.

The transparent cover or dome 15 is of a rigid material and includes an outwardly directed lip 23 abuttingly contacting the front surface of the collar 12 and is fixedly secured thereto by the annular bezel or keeper ring 16 which is secured to the collar 12. To this end, the bezel 16 carries studs 24, for example, four, which are passed through the lip 23 of the cover 15 and bezel 16. The bezel 16 is, in turn, secured to the door 11 as by rivets. The cover 15 is sufficiently sized to cover the projecting periscope 14 without touching. The cover 15 is also darkened on the interior at an upper, or northern, portion as by opaque black 25. The cover 15 can also be tinted or internally silvered in such a manner as to permit outward vision through the security device while preventing a caller from seeing the position of the periscope 14.

A cover 26 is hingedly connected to the eye piece 18 to be swung out of the way to expose the eye piece.

In use, with the periscope 14 in the position shown in FIG. 2, the device permits a viewer looking through the eye piece 18 to look directly ahead in an axial direction at a caller standing outside, through the axial viewing port 19 and lens 20. In this position, radial viewing port 21 faces into the darkened area 25 of the cover 15. At this time, the only source of light is from the outside of the door 11 so that a viewer gazing through the eye piece 18 looks in an axial direction directly through the one-way mirror 22 and the wide angle lens 20 at a caller standing directly outside the door 11. If the caller does not wish to be seen he may, however, have secreted himself to one side out of the field of vision of the wide angle lens 20. The viewer then rotates the periscope 14 clockwise or counter clockwise so that the radial viewing port 21 clears the darkened area 25 of the cover 15. In this position, the light intensities viewed through the radially facing and axially facing viewing ports 21 and 19 are approximately equal. Under these conditions, it is the reflected image entering through the radial viewing port 21 that is seen by the viewer with the transmitted image via the port 19 being so faint as to be virtually unobservable. Thus, if the caller is standing to the side in the line of vision of the radial viewing port 21 his presence will be observed by the viewer.

It may be, however, that the caller has secreted himself on one side of the door opposite from that in which the radial viewing port 21 is facing. To scan the other side of the door therefore, the viewer rotates the periscope 14 between finger and thumb (FIG. 3) through 180° so that the radial viewing port 21 is then facing across the other side of the door. Additionally, the presence of a caller seeking to hide himself below the field of vision of the viewing device can also be detected by turning the periscope round until the radial viewing port 21 is facing downwardly. The range of vision via the radial port 21 is thus only limited by the darkened area 25.

It will be appreciated that in the manner described a caller can be seen whether he is standing directly in front of the viewing device or to the right or left or beneath it, thereby preventing an unwelcome caller from hiding his presence. It is also a feature of the invention that the one-way mirror is substantially opaque to the caller if he attempts to stare in a reverse direction through the device to see whether he is being observed.

What is claimed is:

1. A security viewing device comprising:
   a housing;
   an axially extending periscope rotatably mounted in said housing, said periscope including an axially facing eye piece at one end, an axially facing viewing port at the opposite end, and a radially facing viewing port adjacent said opposite end of said periscope;
   a one-way reflecting surface fixedly mounted in said periscope, said reflecting surface positioned in inclined relation to said radially facing viewing port to reflect light rays entering radially through said radially facing viewing port in an axial direction toward said eye piece, said reflecting surface allowing light rays to pass axially therethrough from said axially facing viewing port to said eye piece; and
   a cover mounted over said opposite end of said periscope and including a darkened area to prevent passage of light rays to said radially facing viewing port when said latter port is facing said darkened area.

2. A security viewing device as set forth in claim 1 wherein said housing includes a collar adapted to be fixedly secured to and extend completely through a door.

3. A security viewing device as set forth in claim 1 wherein said one-way reflecting surface is diposed at an angle of 42° relative to the longitudinal axis of said periscope.

4. A security viewing device as set forth in claim 1 wherein said periscope includes an annular shoulder abutting said housing.

5. A security viewing device as set forth in claim 3 further including lens means mounted in said periscope adjacent said axially facing viewing port for providing a wide angle field of vision.

6. A security viewing device as set forth in claim 2 further including a rigid, transparent cover secured to said collar, said transparent cover enclosing and spaced from said opposite end of said periscope.

7. A security viewing device as set forth in claim 3 wherein said eye piece is located externally of said collar.

* * * * *